United States Patent [19]

O'Connell et al.

[11] Patent Number: 4,760,442

[45] Date of Patent: Jul. 26, 1988

[54] WIDEBAND DIGITAL SIGNAL DISTRIBUTION SYSTEM

[75] Inventors: Steven S. O'Connell, Whippany; Daniel N. Utberg, Randolph, both of N.J.

[73] Assignee: American Telephone and Telegraph Company, AT&T Bell Laboratories, Murray Hill, N.J.

[21] Appl. No.: 753,535

[22] Filed: Jul. 10, 1985

[51] Int. Cl.$^4$ .................... H04N 7/10; H04M 11/08
[52] U.S. Cl. .................................... 358/86; 370/77; 455/4; 455/5; 379/94
[58] Field of Search ............ 179/2 TV, 2 TS; 358/85, 358/86; 455/4, 5; 379/53, 54, 94; 370/77, 85

[56] References Cited

U.S. PATENT DOCUMENTS

| | | | |
|---|---|---|---|
| 3,701,849 | 10/1972 | Stapleton | 179/2 TV |
| 3,757,225 | 9/1973 | Ulicki | 179/2 TV X |
| 3,955,188 | 5/1976 | Viswanathan . | |
| 3,958,088 | 5/1976 | Vieri . | |
| 3,992,686 | 11/1976 | Canning . | |
| 4,054,910 | 10/1977 | Chou et al. | 358/86 |
| 4,081,753 | 3/1978 | Miller . | |
| 4,135,202 | 1/1979 | Cutler | 358/86 |
| 4,228,543 | 10/1980 | Jackson . | |
| 4,430,731 | 2/1984 | Gimple et al. . | |
| 4,475,187 | 10/1984 | Barabas | 358/86 X |
| 4,498,168 | 2/1985 | Tseng . | |
| 4,506,387 | 3/1985 | Walter | 455/612 |
| 4,512,033 | 4/1985 | Schrock | 358/86 X |
| 4,538,174 | 8/1985 | Gargini et al. | 358/86 |
| 4,616,256 | 10/1986 | Boutmy | 358/86 |
| 4,627,076 | 12/1986 | Staal et al. . | |
| 4,682,349 | 7/1987 | Sorriaux | 379/54 |
| 4,686,698 | 8/1987 | Tompkins et al. | 379/53 |

FOREIGN PATENT DOCUMENTS 120742 10/1984 European Pat. Off. ............ 358/86
2538638 3/1977 Fed. Rep. of Germany .

OTHER PUBLICATIONS

"Dial a Program—an HF Remote Selection Cable Television System," *Proceedings of the IEEE*, R. P. Gabriel, Jul. 1970, vol. 58, No. 7, pp. 1016–1023.
Gray et al, "A Multiservice System Using Fiber Optic Loops", *NTG-Fachber*, vol. 73, 1980, pp. 119–124.
W. K. Ritchie, "Multiservice Cable-Television Distribution Systems", *British Telecommunications Engineering*, vol. 1, No. 4, Jan. 1983, pp. 205–210.
Elmer H. Hara, "Conceptual Design of a Switched Television-Distribution System Using Optical-Fiber Waveguides", *IEEE Transactions on Cable Television*, vol. CATV-2, No. 3, Jul. 1977.

Primary Examiner—Keith E. George
Attorney, Agent, or Firm—Jack S. Cubert

[57] ABSTRACT

Wideband digital signals, such as video program signals, are distributed to multiple customer locations by providing the wideband digital signals to all customer line interface units in an intermediate selection terminal which is remote from a central wideband signal distribution office. The individual signals are made available to all line interface circuits by way of nonreflectively terminated transmission lines and high-input-impedance signal tapping circuits. Control signals from customer terminals are used at the corresponding line interface circuit to control digital selection of channels for customer use, any number of customers being able to select simultaneously a common one of said transmission lines. Other control signals from the central office are used to limit customer access to all wideband signals.

6 Claims, 4 Drawing Sheets

WIDEBAND DIGITAL SIGNAL DISTRIBUTION SYSTEM

FIELD OF THE INVENTION

This invention relates to wideband signal distribution systems for digital signals such as video program signals, i.e. digital signal streams each representing a video picture signal and any voice signal corresponding to the picture signal information.

BACKGROUND OF THE INVENTION

Distribution of broadband signals, such a video signals representing television or the like video programs, has been accomplished in a number of different ways with varying degrees of success. Some problems which still generally remain include those typical of cable television in which a relatively large number of different program channel signals are all distributed to every subscriber in analog form—a substantial use of transmission bandwidth to a location that can use only a very small fraction of the available programming at any given time. Another problem is that the customers who are most remote from the signal source may receive a significantly weaker signal than do those who are closer. A poorer quality video picture results. Also linear modems and repeaters of sufficient bandwidth to operate well in such a system are enormously expensive. Furthermore, the arrangement is relatively inflexible, as it is difficult to change features provided by the service. Some examples of different video signal distribution efforts are noted below.

An E. M. Ulicki U.S. Pat. No. 3,757,225 shows a communication system which collects analog television signals and frequency division multiplexes them onto a cable system with command control signals for distribution to a customer station where different programs may be selectively displayed on a common display channel.

In an A. E. Cutler U.S. Pat. No. 4,135,202, analog full optical fiber distribution is accomplished for several program channels. In one embodiment, program selection devices are provided in an intermediate program exchange which employs optical selection devices to enable a program signal to be steered to an individual customer.

A video and data distribution module with a customer terminal, in an I. Gimple et al. U.S. Pat. No. 4,430.731, frequency division multiplexes analog program signals with digital data ard control signals onto a transmission circuit to remote video data distribution modules in different neighborhoods. There a selected program is frequency converted to a range which is appropriate for a particular customer.

In the German patent application disclosure document No. 25,38,638, there is shown a digital distribution system for video program signals. A program signal stream is coupled through a switch matrix, in the same office with switch matrices for the voice and video parts of video telephone service, to a particular customer over an optical fiber link. The method for communicating customer selections to the switch is not specifically shown.

A T. W. Canning U.S. Pat. No. 3,992,686 teaches a backplane transmission line system for distributing signals among printed circuit boards. Components on one circuit board are interconnected to other circuit boards by way of transmission lines terminated at both ends with the characteristic impedance.

In an R. P. Gabriel paper "Dial a Program—an HF Remote Selection Cable Television System," *Proceedings of The IEEE,* Vol. 58, No. 7, July 1970, pages 1016-1023, there is shown another analog signal distribution system with a program exchange employing stepping switches responsive to dialing signals from a customer to direct a particular program signal to that customer.

An example of a video telephone type of switching system is shown in an R. J. Stapleton U.S. Pat. No. 3,701,849 wherein wideband signals are communicated between individual customers by way of a switching office.

SUMMARY OF THE INVENTION

Wideband signal distribution systems are improved by transmitting each of a plurality of wideband signals in digital form on an individual, nonreflectively terminated, transmission line extending among a plurality of customer line interface circuits. Each customer line interface circuit includes high-input-impedance tap couplings for signals from the different transmission lines and circuitry controllable for selectably coupling at least one of the tap couplings to an output connection of the line interface circuit.

BRIEF DESCRIPTION OF THE DRAWING

A more complete understanding of the invention may be obtained from a consideration of the following Detailed Description in connection with the appended claims and the attached Drawings in which

DETAILED DESCRIPTION

Figure 1:
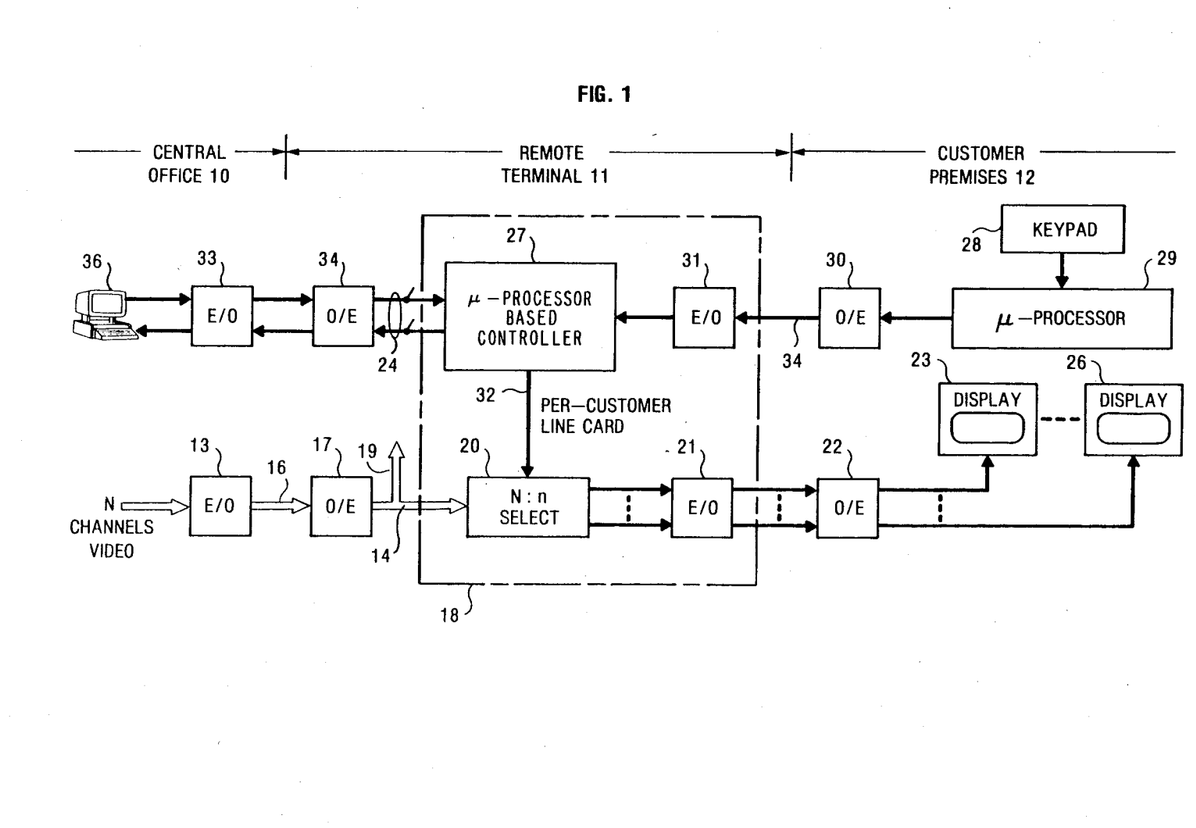
FIG. 1 is a functional block diagram of a video program distribution system in accordance with the invention.

FIG. 1 illustrates a wideband data signal distribution system for video program, i.e. picture and associated sound, signal distribution. The system of FIG. 1 includes portions in a central office 10, such as a switching office in the public switched telephone network (PSTN), a remote terminal 11 at which wideband signal switching or routing to customer premises is accomplished, and an illustrative customer premises 12 of a customer who receives one or more selectable video programs at a time. A plurality N of video program sources (not shown) provide digitally encoded program signals, assumed to be in electrical form, to the office 10 wherein they are individually converted to optical, i.e. lightwave, form in electro-optical signal converters collectively represented by a converter 13. Digitally encoded signals are employed because, as compared to, e.g., analog signals representing the same information, they can be relatively inexpensively regenerated to remove transmission-induced distortions; and they are well suited for digital logic selection gating. Outputs of the converter 13 are transmitted via N separate lightguide fibers 16, schematically represented by a single broad arrow, to the remote terminal 11. Plural such terminals, only one being shown, are advantageously provided at intermediate locations in the transmission paths between the office and customers. Each terminal such as 11 is typically at a substantial distance from the office 10 and in the geographical neighborhood of a group of customers.

In remote terminal 11, the digitally encoded video program signals in optical form are restored individually to digitally encoded electrical form by opto-electric converters schematically represented by a single such converter 17. N individual video program signals appear in separate circuit paths of a cable 14 in the output of converter 17 and are applied in parallel to a plurality of customer line interface circuits, or cards, such as the card 18 within the broken-line box in the drawing. Availability of the N separate video program signals to other line cards is schematically represented by an angled broad arrow 19 in the drawing.

Figure 3:
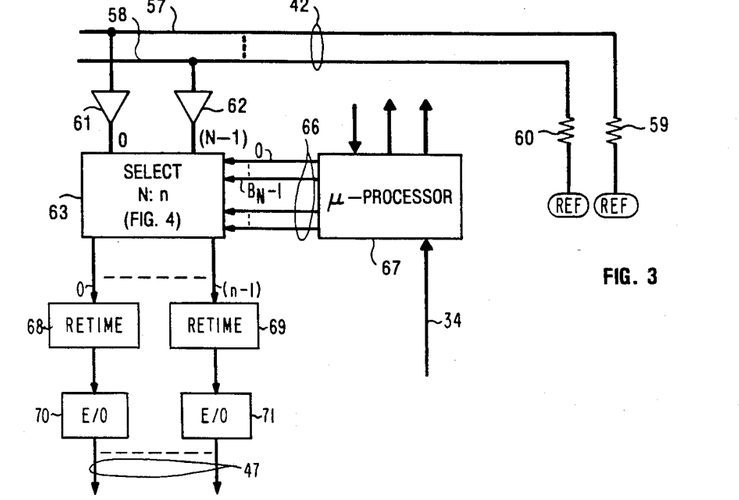
FIG. 3. is a diagram of a customer line card for use in FIG. 2.
Figure 4:
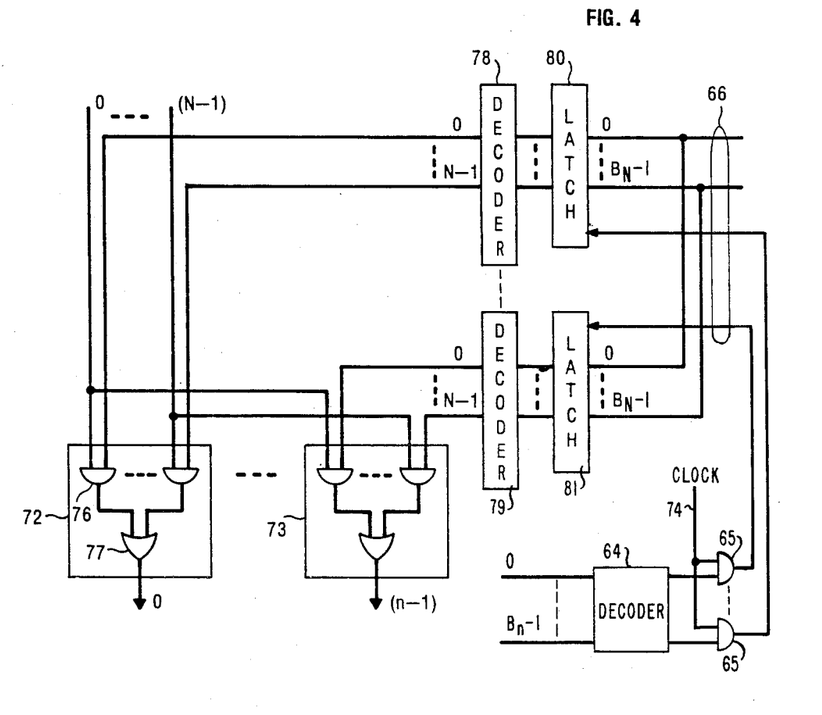
FIG. 4 illustrates detail of program select logic used in FIG. 3.

A line card contains the customer line interface circuitry for providing selectable wideband data signal distribution service to an individual customer. Within the circuitry of line card 18, a select circuit 20 is provided for selecting among the N available video signals, herein sometimes called channels, any one or more of n channels, where $n < N$, for extended transmission to the customer premises 12 associated with that line card. Signals of any selected channel are reconverted to optical form, again as schematically represented by a single electro-optical converter 21. At the premises 12, another opto-electrical converter 22 represents restoration of optical signals to the electrical format before application of video program signals to respective ones of display devices such as television receivers 23 and 26. Video signals are reconverted to analog form, if necessary for the particular receiver, by a suitable digital to analog converter (not shown). Select circuit 20, disclosed in greater detail in FIGS. 3 and 4, illustratively allows selection of one or more, e.g. $n=2$, video program signals from a set, such as $N=36$, of such signals. The selection is made under the joint control of signals provided from central office 10 for access control of all customers and from individual customer premises 12 for individual customer selection requests.

A microprocessor based controller 27 on card 18 receives digital channel selection signals from customer premises 12 by way of a customer operated keypad 28, a microprocessor 29, electro-optical converter 30, and opto-electrical converter 31. Any suitable controller can be employed for controller 27, and in one application an Intel 8051 microcontroller was employed. Microprocessor 29 translates keystrokes to corresponding binary coded signals for transmission to remote terminal 11. Such control information is transmitted either for current time control of channel selection or for prospective control, e.g., a customer can order access to a certain channel or group of channels at a certain future date and hour or at specified periodically occurring times. This is sometimes called "pay per view" service; and the video programming is secure, from the programming provider's standpoint, without need for scramblers. The manner of inputting and transmitting such control information is well known and comprises no part of the present invention.

Controller 27 responds to selection signals from premises 12 for current time selections by providing corresponding control signals, illustratively six bits, on a bus 32 to select circuit 20. Selection signals from premises 12 for prospective time selections are relayed to central office 10 which advantageously manages such prospective orders along with customer billing in a manner now well known in the art. Those prospective orders are combined with similar orders from interface circuitry of other line cards in a bidirectional transmission circuit 24 and transmitted to office 10 by way of converters 34 and 33, which convert between electrical and optical formats as appropriate for the particular direction of transmission. In the office 10 the order signals are processed automatically or by an operator, as schematically represented by a computer terminal 36. At appropriate times channel access information for a particular customer is transmitted back to the appropriate line card microprocessor controller for implementation. Short diagonal line connections on circuits extending between controller 27 and converter 34 schematically represent parallel, e.g., time multiplexed, control signal couplings of the type described between office 10 and all line cards at the remote terminal 11.

It should be appreciated from the foregoing that by handling the current time, channel selection orders from customers at individual line cards in the remote terminal, the problem of prime time, half hourly overload on a central office video switch is avoided. In addition, a high degree of flexibility is available in that changes can be made readily in the type service provided to a customer either by changing the type of line card employed, e.g., for single-channel or multichannel availability, or by changing the channel access instructions from office 10, e.g., for periodic access to certain channels or for so-called pay-per-view access to a specific show in real time, or at a selectable play-back time if the office or terminal 11 is equipped for program signal storage and playback.

Figure 2:
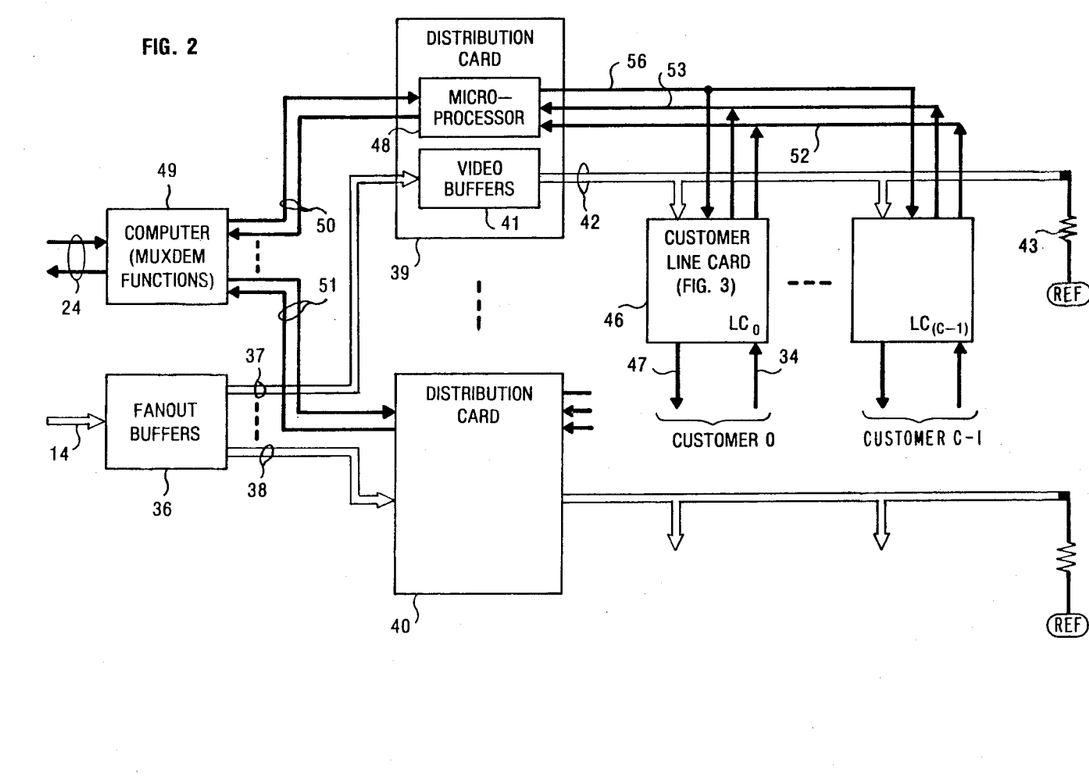
FIG. 2 is a diagram in greater detail of a remote terminal portion of the system of FIG. 1.

FIG. 2 illustrates the remote terminal 11 in greater detail. Video program signals on respective circuits of cable 14 are each coupled by a separate buffer amplifier in an array of fanout buffers 36 to a plurality of cables, such as cables 37 and 38, for application of signals to a respective different subset of customer line cards, e.g., the cards mounted on a single shelf of an equipment rack (not separately shown). Each of the buffers 36 provides suitable gain for the fanout of a different one of the N digitally encoded video signals to N separate outputs of that amplifier. For each line card subset a distribution card, such as one of cards 39 and 40, provides several functions. One of the functions is performed by a set of video buffers 41 for separately providing buffering of the N individual program signals to the subscriber line cards. Such buffering compensates for such things as impedance mismatches and cable crosstalk between cables 37 and 38. The distribution cards are alike so details of only one are illustrated.

Output of each of the N buffers 41 is coupled to an input of a different transmission line in a cable 42. Each such line is provided at its remote end with a nonreflecting termination, schematically represented for all transmission lines by the single resistor 43 connected between the end of the cable and a terminal of a reference voltage supply which has its other terminal (not shown) connected to ground. It is assumed that circuits of all of the illustrated line interface circuit blocks are provided with a ground reference even though such is not separately shown. At each line card, e.g., card 46 of a subset of cards, all transmission lines are separately tapped to provide a high input impedance coupling to a buffer amplifier as shown in greater detail in FIG. 3. The coupling impedance must be high enough so that the coupling does not significantly reduce signal amplitude available along the transmission line to inputs of any other of the C cards of the subset coupled to that transmission line. In the illustrative embodiment, there are C=12 cards to an equipment shelf.

One or more program channels, selected as previously outlined, are coupled through a line card to appear at its video signal output. That output is advantageously in optical signal form on one or more lightguide fibers 47 for transmission to the associated customer premises. It is noted that, although there are many amplifiers mentioned in the many video signal paths, the signals involved are binary coded, digital signal pulses; and the amplifiers are relatively simple transistor amplifiers. For example, five-transistor, differential amplifiers have been employed; and these do not require the filtering for wideband linearity required for analog video signaling. Such asynchronously operated digital signal amplifiers are much less expensive to implement than would be the case for a suitable number of broadband linear amplifiers required for analog signal distribution systems.

Distribution cards, such as card 39, also include a microprocessor 48 for time multiplexing and demultiplexing (muxdem) digital control signals to be bidirectionally coupled between the central office and the various line cards of a line card subset. Similarly, a computer 49 performs bidirectional muxdem functions for such control signals with respect to all of the subsets of line cards. Access control signals from the central office and coupled via the circuit 24 are demultiplexed and distributed to appropriate ones of bidirectional control circuits, such as circuits 50 and 51, of the card subsets. In one such application, for 300 customer line cards, twelve cards were included in each of twenty-five subsets. Employment of a microprocessor 48 in each distribution card in cooperation with the computer 49 in a software controlled muxdem operation makes reconfiguring of the system to add or subtract customers relatively simple and inexpensive.

Between microprocessor 48 and the line cards, a service circuit 52 receives signals from line card controllers indicating when they are ready to send or receive messages. Microprocessor 48 collects, via an uplink circuit 53, or distributes, via a downlink circuit 56, traffic as necessary in accordance with any of the known local area network protocols. Each of the line cards, such as 46, has an input connection from the circuit 56 and outputs the circuits 52 and 53. In addition each line card has an input connection for its circuit 34 from the associated one of the customer premises for receiving channel selection signals for both current time and prospective selection orders. The line card microprocessor executes current time selection orders as received and passes on prospective selection orders via circuit 53 for use in central office 10. As previously noted, the central office facilities use the prospective selection order information to provide access control signals through the described paths and down link circuit 56 to guide the appropriate line card controller in its execution of current time orders.

Illustratively, line interface circuits of all line cards are essentially the same, and one embodiment thereof is shown in greater detail in FIGS. 3 and 4. Likewise, all card subsets are arranged in essentially the same manner so only the one subset has been hereinbefore described and others are schematically represented by the distribution card 40 and illustrated partial connections thereto.

FIG. 3 depicts further detail of one of the line card interface circuits, such as the circuit of card 46, and its connections to two, 57 and 58, of the N transmission lines of the cable 42. Each of those transmission lines is, for example, a printed wiring board microstrip line. These two transmission lines are terminated in their characteristic impedances, schematically represented in the form of resistors 59 and 60, respectively, each connected between a reference voltage and an end of its transmission line remote from the associated distribution card. High input impedance amplifiers, such as amplifiers 61 and 62, couple tapping points on transmission lines 57 and 58, respectively, to N different input connections to a selecting circuit 63 (shown in greater detail in FIG. 4). The amplifiers are for example MC 10101 ECL or gate amplifiers which exhibit sufficiently high impedance to permit accurate digital signal coupling from the transmission line without unduly reducing the remaining signal on the line for use by other line interface circuits of the subset. Thus, any one or more of the customers served by terminal 11 can access the same video program channel at the same time if they wish.

Selecting circuit 63 is responsive to $B_N + B_n + 1$ selection control signals. $B_N$ is an integer number of binary coded signal bits (where $B_N \geq \log_2 N$) designating one of the N input digital video program signals at a time. Similarly $B_n$ is an integer number of binary coded signal bits (where $B_n \geq \log_2 n$) designating one of the n outputs of the circuit 63. An additional clock signal lead is not specifically shown in FIG. 3. The selection control signals are provided via multiple signal paths 66 from a microprocessor 67. That microprocessor receives at one input the channel select circuit 34 from the associated customer premises, and it also has connections to circuits 52, 53, and 56 for the aforementioned channel access communication with the central office via the distribution card circuits of the line card subset.

If a customer has unlimited access to all video program signals at all times, no access control is required. However, customers often are interested in having their access limited to channel-time parameters which match their particular needs and can be obtained at reduced cost. To that end, office 10 supplies to each line card microprocessor 67 for such customer signals defining the video signal channel and time limits for access by that customer. Those limits are stored in microprocessor memory, not separately shown, and used by the microprocessor 67 for comparing current time, channel selection orders and time of reception of such orders with the stored limit information to determine whether or not access will be granted. Such software controlled comparing operations are well known in the art and require no further description.

Each of the digitally encoded signal outputs $0-(n-1)$ of circuit 63 is retimed in its individual retiming circuit, such as one of the circuits 68 and 69, before being converted to optical form in the electro-optical converters 70 and 71, respectively, on the way to optical fibers 47 and the customer premises. Retiming is provided because prior circuits are asynchronous, and a certain amount of edge jitter and data skewing can be picked up which should be removed before transmission on to the customer. One conventional retiming arrangement employs a phase locked loop type of circuit to detect the phase at the digital signal bit rate and use the recovered timing information to clock a D-type bistable circuit in the video signal path for regenerating the digital signals cleanly.

In FIG. 4 the selecting circuit 63 includes n arrays, one for each output, of logic gates for selecting digitally encoded video signals. Two such arrays, 72 and 73, are shown; and each includes one AND logic gate, e.g., 76, for each of the N digitally encoded video program channel signals and an OR gate 77 to combine outputs of those AND gates to an associated output to combining circuit 70. Each AND gate also has an enabling input from a different output of a $B_N$-input-to-one-out-of-N-output decoder, such as the two decoders 78 and 79 illustrated. Latch address circuits in the signal paths 66 supply signals to select one of a set of n latch circuits, such as circuits 80 and 81, at a time for storing the $B_N$-bit coded signal designating a video program channel. Those $B_N$-bit coded signals designate one of the circuit 63 inputs and hence one of the AND gates of the one of the gate arrays, e.g., 72, 73, corresponding to the decoder.

A decoder 64 reduces the binary coded address information to one-out-of-n format for actuating one AND gate of a set 65 of such gates. Those gates are all enabled from time to time by a clock signal provided on a lead 74 from microprocessor 67 when new selection information, including information indicating removal of all selection, is to be latched. The actuated one of the enabled AND gates provides an output for clocking a corresponding one of the latch circuits to store that new information. Those stored coded signals are then continuously available, through a corresponding one of the decoders for enabling one AND gate per array.

Figure 5:
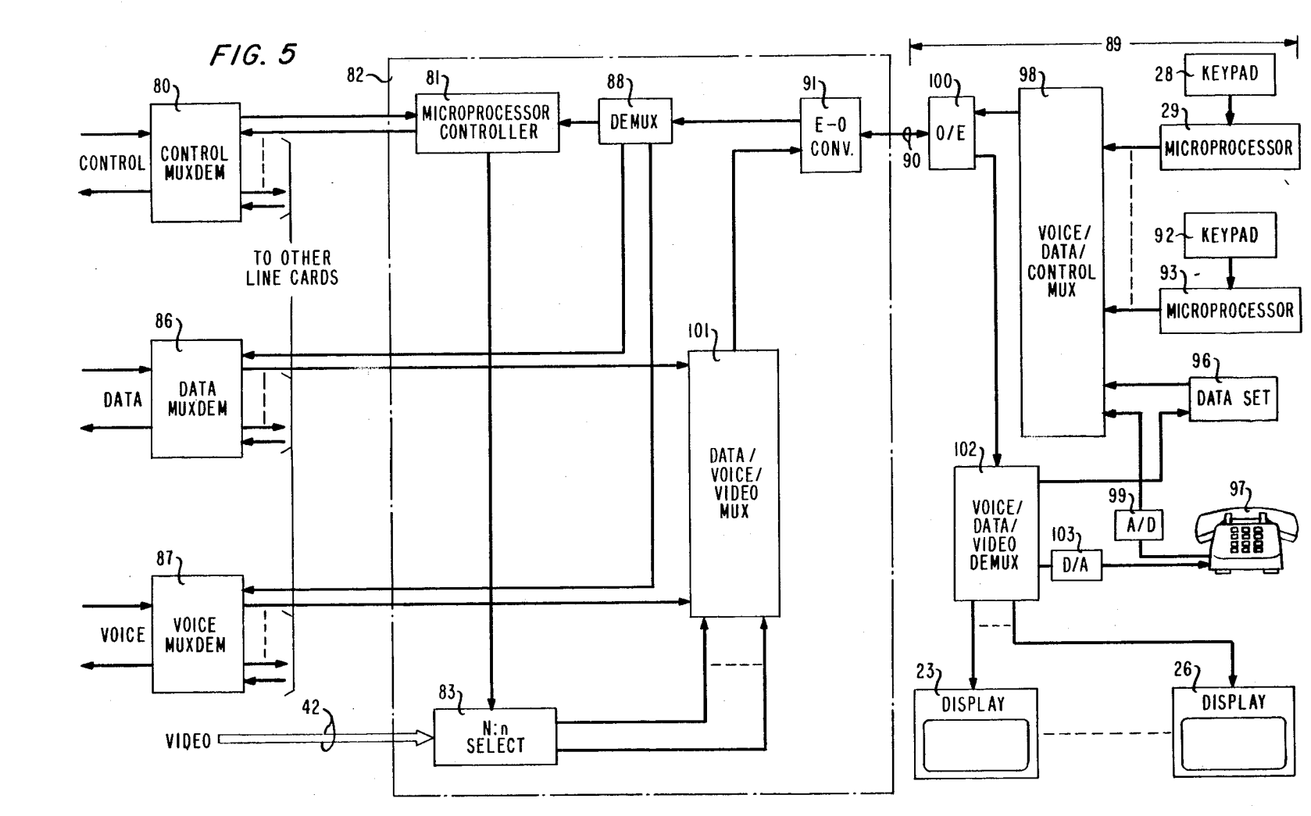
FIG. 5 is a block diagram of a wideband signal distribution system for distributing customer voice and customer data along with selected video signals.

FIG. 5 illustrates a modification of the FIG. 1 system to achieve a wideband service in which, in addition to the previously described wideband video program signal distribution, and control of selection of such signals, there are provided arrangements for accommodating bidirectional communication of customer narrowband digital signals. Only one connection 90 is needed to the customer. Such narrowband digital signals include, for example, digitalized voice communication (independently of the voice signals associated with any distributed video program signal) and bidirectional data communication (independently of the mentioned control signal communication) between the central office and a customer's premises. Those arrangements provide further for those voice and data communication signals to be multiplexed with the wideband signals, illustratively, onto a single lightguide fiber between the remote terminal and those customer premises.

In FIG. 5, a control muxdem 80 replaces the circuit branching point represented in FIG. 1 between converter 34 and line card 18 for control signals passing between the central office and the line cards of the remote terminal 11. Those control signals include signals from the customer for controlling the future program selections of the customer and time-channel signals from the office for controlling the extent of access to program signals to be permitted to the customer. A microprocessor based controller 81 provides the control signal interface for a modified line card 82 through that muxdem 80. Controller 81 output determines selection of one or more of n wideband video program signals, with associated voice, from the N inputs to select circuit 83 from transmission lines of cable 42 as previously outlined in connection with the embodiment of FIG. 1.

Bidirectional data signal communication coupling is provided between card 82 and a data muxdem 86, and similar coupling is provided through other bidirectional couplings between the muxdem and other line cards. The central office 10 facilities are advantageously employed in the usual manner for receiving data signals from different destinations and switching and multiplexing them there as needed to route them to the destinations to be reached through the muxdem 86 in remote terminal 11; and similarly the office demultiplexes signals from that muxdem and switches them to their respective destinations as is well known in the art. In a similar manner, a voice muxdem 87 provides bidirectional coupling for digitalized voice signals between the central office and the various line cards of the remote terminal 11.

Each line card, such as card 82, includes a demultiplexer 88 for receiving voice, data, and selection control signals from an associated customer premises 89 by way of a single bidirectional optical fiber 90 and an electrical-optical signal mode converter 91. That converter includes, for example, a combiner for coupling signals in optical form both out of and into the same end of the fiber 90, modulated at different wavelengths for each direction of transmission, as shown illustratively in a paper "An Engineering Guide to Couplers" by J. C. Williams et al., *Laser Focus,* Vol. 17, No. 10, pages 129–134. Appropriate individual converters, electrical-to-optical for input to the fiber and optical-to-electrical for output from the fiber, are also employed.

At the customer premises 89, displays 23 and 26 and keypad 28 and microprocessor 29 are provided as before. In addition other facilities are provided. Multiple keypad-microprocessor units are available as schematically represented by the keypad 92 and microprocessor 93. Also included are a data set 96 and a conventional telephone station set 97. Outputs from any one or more of the microprocessors 29 or 93, the data set 96, and the telephone set 96 are applied to a voice/data/control multiplexer 98, through an analog- to-digital converter 99 in the case of the telephone set output. The time multiplexed output of multiplexer 98 is then coupled through an electrical-to-optical converter 100, wherein it is also modulated to the wavelength for uplink direction of transmission via fiber 90, to the remote terminal. In converter 91 in that terminal, those uplink wavelength signals are restored to baseband electrical format and coupled to the input of demuxer 88.

In the remote terminal 11, the line card 82 includes a data/voice/video multiplexer 101 for combining digital data and voice signals from muxdems 86 and 87 with digitalized video (with its associated voice) signals for the selected n program signal channels from select circuit 83. Time multiplexed output of that circuit includes all of those signals combined into a single electrical signal stream for application to an input of converter 91 and thence application in optical form to the downlink wavelength on fiber 90. At customer premises 89, the multiplexed signals are restored to electrical form in converter 100 and coupled from there to a voice/-data/video demultiplexer 102 in which the video program signals are separated out for application to appropriate ones of the displays 23. 26, data signals are separately applied to data set 96, and voice signals are coupled through a digital-to-analog converter 103 to the station set 97.

Although the invention has been described in connection with a particular embodiment thereof, it is to be understood that additional embodiments, applications, and modifications thereof, which will be apparent to those skilled in the art, are included within the spirit and scope of the invention.

What is claimed is:

1. A wideband digital signal distribution system comprising a plurality of signal transmission paths each including a different substantially non-reflectively terminated transmission line, means for separately tapping signals from different locations along each of said transmission lines, a plurality of subscriber line interface circuits each including one or more output connections and controllable means for selectably coupling signals from among the tapping means of more than one of said transmission lines to the one or more output connections of the line interface circuit, said selectably coupling means comprising means for receiving control signals, means, responsive to said control signals, for coupling a selected one of said tapping means to one of said one or more output connections of said each interface circuit, means responsive to said control signals for coupling a selected one or more additional ones of said tapping means to the one of said one or more output connections of each interface circuit, and means for time multiplexing the digital signal from said selected one of said tapping means and the digital signals from said selected one or more additional ones of said tapping means onto one of the one or more output connections of said interface circuit.

2. A wideband digital signal distribution system comprising a plurality of signal transmission paths each including a different substantially non-reflectively terminated transmission line, means for separately tapping signals from different locations along each of said transmission lines, a plurality of subscriber line interface circuits each including controllable means for selectably coupling signals from among the tapping means of more than one of said transmission lines to an output connection of the line interface circuit, a central office remotely located with respect to said transmission lines and said subscriber line interface circuits, said office having plural wideband digital signal output connection, means for coupling said office output connections to said transmission line, respectively, and a plurality of customer terminals located in the vicinity of said transmission lines and said subscriber line interface circuits, and means for coupling an output connection of each of said interface circuits to a different one of said customer terminals.

3. The signal distribution system in accordance with claim 2 in which said terminated transmission lines are grouped into sets of such circuits, said line interface circuits are grouped into subsets of such circuits, each interface circuit subset being coupled to a different one of said sets of said transmission lines, and said office output connections coupling means comprises means for separately amplifying each on said wideband digital data signals for presenting it at plural fanout output connections of a different one of such separately amplifying means, and means for coupling a different output to each of said separately amplifying means to respective lines of a different one of said sets of transmission lines, such different output coupling means including buffer amplifier means at an input to each transmission line for isolating such line from lines in other ones of said sets coupled to the same one of said separately amplifying means.

4. The signal distribution system in accordance with claim 2 in which said selectably coupling means in each line interface circuit comprises means for receiving transmission line select control signals from one of said customer terminals coupled to such line interface circuit, and means, responsive to said transmission line. select control signals, for coupling one of said at least one tapping means to said output connection said each line interface circuit.

5. The digital signal distribution system in accordance with claim 2 in which said central office receives any one or more of voice, data, and video program signals for at least one of said customer terminals and in which there are provided in each of said line interface circuits means, including said line interface circuit output connection, for bidirectional transmission of voice and data signals from and to said line interface circuit with respect to one of said customer terminals, said bidirectional transmission means including means for receiving control signals from a customer terminal, means for transmitting customer voice data signals received from a customer terminal to said central office, means for applying at least a portion of said control signals to control said selectable coupling means, means for time multiplexing together voice and data signals received from said central office with video program signals from said selectable coupling means, and means for applying multiplexed signals from an output of said multiplexing means to said output connection.

6. In a system for distributing selectable ones of plural wideband digital signals on respective supply circuits to individual customer terminals via respective customer line signal paths, each of said supply circuits being a transmission line substanially terminated in its characteristic impedance, and a separate line interface circuit for interfacing each customer line signal path with said supply circuits, the improvement in each of said line interface circuits comprising a plurality of means for receiving wideband digital signals from respective ones of said transmission lines, each receiving means having a sufficiently high impedance for coupling signals from one of said transmission lines without significantly loading that transmission line, means for receiving from said each said line signal path of said interface circuit customer signals for controlling selection of said wideband digital signals, and means, coupled to one of said plurality of transmission line signal receiving means, respectively, and responsive to said customer signals, for selecting one wideband digital signal from the output of its transmission line signal high input impedance receiving means, means coupled to another of said transmission line signal receiving means responsive to said customer signals for selecting at least one additional wideband digital signal from the output of said another of its transmission line high input impedance means, and means for time multiplexing said selected one wideband digital signal and said selected at least one additional wideband digital signal onto one of said line signal paths.

* * * * *